(12) United States Patent
Voeller et al.

(10) Patent No.: US 9,990,376 B2
(45) Date of Patent: Jun. 5, 2018

(54) METHODS FOR IDENTIFYING A VEHICLE FROM CAPTURED IMAGE DATA

(71) Applicant: Hunter Engineering Company, St. Louis, MO (US)

(72) Inventors: David A. Voeller, St. Louis, MO (US); William D. Heine, Florissant, MO (US); John D. Klarer, St. Charles, MO (US)

(73) Assignee: Hunter Engineering Company, St. Louis, MO (US)

( * ) Notice: Subject to any disclaimer, the term of this patent is extended or adjusted under 35 U.S.C. 154(b) by 27 days.

(21) Appl. No.: 15/190,008

(22) Filed: Jun. 22, 2016

(65) Prior Publication Data

US 2016/0379487 A1 Dec. 29, 2016

Related U.S. Application Data

(60) Provisional application No. 62/183,391, filed on Jun. 23, 2015.

(51) Int. Cl.
| | |
|---|---|
| *G08G 1/017* | (2006.01) |
| *G06F 17/30* | (2006.01) |
| *H04N 5/232* | (2006.01) |
| *G06K 9/00* | (2006.01) |
| *G06K 9/46* | (2006.01) |

(52) U.S. Cl.
CPC .... *G06F 17/30247* (2013.01); *G06F 17/3028* (2013.01); *G06K 9/00758* (2013.01); *G06K 9/00825* (2013.01); *G06K 9/46* (2013.01); *G08G 1/0175* (2013.01); *H04N 5/232* (2013.01)

(58) Field of Classification Search
CPC .. B02C 23/08; B03B 5/00; B03B 5/34; B03B 9/00; B03B 9/02; G06F 17/30247; G06F 17/3028; G06K 9/00758; G06K 9/00825; G06K 9/46; G08G 1/0175; H04N 5/232
USPC ............................. 340/937, 293, 932.2, 933
See application file for complete search history.

(56) References Cited

U.S. PATENT DOCUMENTS

| | | | |
|---|---|---|---|
| 6,405,988 B1 * | 6/2002 | Taylor | B60N 2/01516 248/429 |
| 7,770,525 B2 * | 8/2010 | Kumar | B61C 7/04 105/172 |
| 7,825,829 B2 | 11/2010 | Madsen | |
| 8,447,112 B2 | 5/2013 | Paul et al. | |
| 2004/0161133 A1 * | 8/2004 | Elazar | G01S 3/7864 382/115 |
| 2004/0199785 A1 * | 10/2004 | Pederson | G07C 9/00158 340/293 |
| 2004/0240542 A1 * | 12/2004 | Yeredor | G06K 9/00771 375/240.01 |
| 2005/0169500 A1 * | 8/2005 | Takahashi | G06K 9/00785 382/104 |
| 2009/0324010 A1 * | 12/2009 | Hou | G06K 9/00771 382/103 |

(Continued)

*Primary Examiner* — Ojiako Nwugo
(74) *Attorney, Agent, or Firm* — Sandberg Phoenix

(57) ABSTRACT

An imaging sensor observes a field of view through which a vehicle passes, at an orientation and position suitable for acquisition of license plate data from a surface of the vehicle. Responsive to the vehicle position, at least one image of a surface of the vehicle including a license plate is acquired and evaluated to extract license plate data. The position of the vehicle for acquisition of the image is established by a trigger in a fixed relationship with the imaging sensor.

18 Claims, 6 Drawing Sheets

(56) References Cited

U.S. PATENT DOCUMENTS

| | | | |
|---|---|---|---|
| 2014/0152472 A1* | 6/2014 | Tseng | G08G 1/146 340/932.2 |
| 2014/0270383 A1* | 9/2014 | Pederson | G08B 13/19647 382/104 |
| 2014/0307923 A1* | 10/2014 | Johansson | G06K 9/00624 382/105 |
| 2014/0363052 A1* | 12/2014 | Kozitsky | G06K 9/00624 382/105 |

* cited by examiner

METHODS FOR IDENTIFYING A VEHICLE FROM CAPTURED IMAGE DATA

CROSS-REFERENCE TO RELATED APPLICATIONS

The present application is related to, and claims priority from, U.S. Provisional Patent Application Ser. No. 62/183,391 filed on Jun. 23, 2015, and which is herein incorporated by reference.

STATEMENT REGARDING FEDERALLY SPONSORED RESEARCH

Not Applicable.

BACKGROUND OF THE INVENTION

The present application relates to methods for selecting or capturing image data in response to a trigger signal, and more particularly, to a vehicle identification method in which an image of a license plate on a vehicle moving through a field of view of an imaging sensor is captured in response to a trigger signal indicating either the front or rear surface of the vehicle is ideally located within a license plate observation area for acquisition of a license plate image.

Vehicle license plate recognition (LPR) image-processing technology is commonly utilized to capture identifying information from an image of a vehicle license plate. The technology is often used in a variety of security and traffic control or monitoring applications. A typical LPR system includes at least one imaging sensor for acquiring images of a vehicle, and an image processing system for evaluating the acquired images to identify visible license plates and extract relevant alpha-numerical data. The LPR system may further include an illumination system for use when ambient light is insufficient to illuminate the vehicle and license plate surfaces, and a network connection for exchanging data with one or more remote systems. The image processing system may be implemented as a hardware or software component associated with the imaging sensor, or may function as an independent processing system in communication with the imaging sensor.

A variety of techniques are known for triggering the acquisition of images by an imaging sensor, or the selection of a specific image frames in a stream of sequential images acquired continuously by the imaging sensor. In an automotive license plate recognition context, these techniques may include the interruption of optical beams by a passing vehicle, activation of pressure or inductive sensors on a roadway surface triggered by a passing vehicle, or the use of motion sensors to detect the movement of a passing vehicle. Some systems, known as edge cameras, continuously acquire a stream of images representative of a field of view, and apply a brute force image analysis approach to evaluate each individual image to identify the presence of a license plate from which license plate data can be extracted. This type of approach requires an expensive high-speed image processing system to enable every acquired image to be evaluated for license plate information. A significant amount of time and resources are wasted processing images in which no vehicle or license plate is present.

When acquiring an image of a vehicle for the purpose of identifying license plate data, it is useful to acquire the image when the front or rear portion of the vehicle is within a selected region of the imaging sensor's field of view. This ensures that a license plate, if present on the vehicle, can be adequately resolved within the acquired image, enabling appropriate image processing to extract vehicle identifying data. Systems which rely upon the detection of a vehicle entering a field of view lack the ability to accommodate vehicles of varying wheelbases when attempting to capture images of the rear surfaces of the vehicle. For example a short wheelbase vehicle, upon triggering an interrupt signal from an optical beam, may be too far from the imaging sensor, while the rear surfaces of a long wheelbase vehicle may not yet have passed fully into the field of view of the imaging sensor upon triggering the interrupt signal. Inductive sensors and pressure sensor experience similar issues with an inability to identify the leading or trailing edge of the vehicle to any degree of precision.

Accordingly, it would be advantageous to provide an efficient and low-cost method for triggering an imaging sensor to capture an image, or to select an image frame from a video stream for further evaluation, only when the front or rear surface of a passing vehicle is at an ideal location, or within an ideal observation region, for acquisition of license plate data within the imaging sensor's field of view.

BRIEF SUMMARY OF THE INVENTION

In a method of the present disclosure for identifying a passing vehicle, an imaging sensor observes a field of view through which the vehicle passes, at an orientation and position suitable for acquisition of license plate data from a rear surface of the vehicle when is it located within an observation area. An optical target is located within the field of view, at a position which is obscured by a passing vehicle until the movement of the vehicle brings the rear surface of the vehicle into the observation area. With the optical target and the imaging sensor in a fixed relationship, windowed regions of sequential images acquired by the imaging sensor are evaluated by an image processing system to identify the presence or absence of the optical target within captured images, triggering an evaluation to acquire observed license plate data from the image or image frame in which the optical target is observed following an image or image frame in which the optical target was obscured by the passing vehicle. Acquired license plate data is then associated with the acquired image of the passing vehicle, and/or utilized to access or store vehicle identifying data indexed within a data storage system.

In a further method of the present disclosure for vehicle identification, an imaging sensor is disposed to observe a field of view through which a vehicle passes, at an orientation and position suitable for acquisition of license plate data from a rear surface of the vehicle when it is disposed within an observation region suitable for evaluating license plate data. A distance measurement sensor is disposed to observe distances along an axis, such that an observed distance will vary in response to the presence or absence of a vehicle passing through the imaging sensor field of view. The observed distance measurements are monitored to identify the passage of a vehicle through the imaging sensor field of view, and to generate a trigger signal to the imaging sensor when the observed distance measurements change in response to the rear surface of the vehicle receding from the imaging sensor while passing through the observation region. One or more images are acquired by the imaging sensor in response to the generated trigger signal, and are processed to acquire observed license plate data which is then associated with the acquired image of the passing vehicle and/or utilized to access or store vehicle identifying data indexed within a data storage system.

In an alternate method of the present disclosure for vehicle identification, an imaging sensor is disposed to observe a field of view through which a vehicle passes, at an orientation and position suitable for acquisition of observed license plate data from a rear surface of the vehicle when it is passing through an observation region. A trigger system which is disposed in relation to the observation region generates an appropriate trigger signal for the imaging sensor when a rear surface of a vehicle passes through the observation region. Images captured by the imaging sensor following the generated trigger signal are processed to acquire observed license plate data which is then associated with the acquired image of the passing vehicle and/or utilized to access or store vehicle identifying data indexed within a data storage system.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
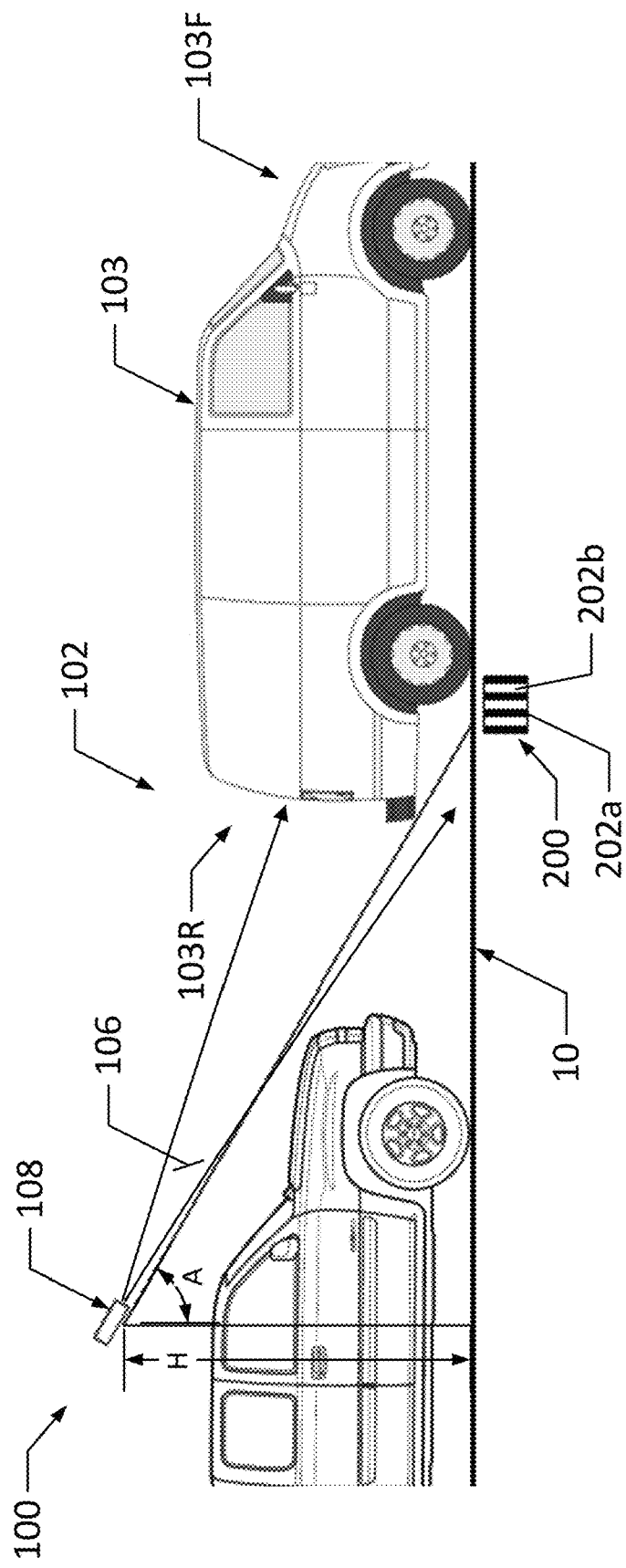
FIG. 1 is an illustration of the positioning of an optical target feature relative to an imaging system and a line of vehicles passing through an associated field of view.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

In general, as seen in FIG. 1, the present disclosure provide methods for a vehicle service system 100, such as a vehicle inspection system, a customer greeting system, or vehicle detection system, to monitor an observation area 102 through which a vehicle 103 undergoing will pass, to detect the presence of the vehicle 103 at a position which is ideal for the purpose of acquiring vehicle identifying information in the form of license plate data. Monitoring the movement of the vehicle 103 through the observation area 102 provides an indication of when a front surface 103F or rear surface 103R of the vehicle 103 will be located within a region in the observation area 102 which is ideal for capturing an image of the rear surfaces 103R of the vehicle on which a license plate 105 may be present, from which associated license plate data can be identified. Acquired images are evaluated to identify any license plate data present, which in turn is associated with at least one item of vehicle-specific or identifying data. The association by the vehicle inspection system 100 may be newly created, such as by keying the license plate data to an acquired image of the vehicle 103, or may be in the form of a previously stored record retrieved from a database indexed or keyed by the license plate data. Previously stored records indexed or keyed by the vehicle license plate data may include, but are not limited to, vehicle identification numbers, vehicle makes, vehicle models, vehicle owner information, vehicle service records, vehicle recall records, recommended vehicle services, or vehicle inspection results.

One method of the present disclosure for vehicle identification by a vehicle inspection system 100 monitors an observation area 102 by acquiring a sequence of images, each of which are evaluated to identify the presence (or absence) of specific target features 200. When the specific target features 200 are obscured by the presence of a vehicle 103 in one image, and are revealed in a subsequent image by the movement of the vehicle 103 into an ideal position for the acquisition of an image containing license plate data, the vehicle inspection system 100 evaluates the subsequent image to identify and extract the associated license plate data for the vehicle 103, which is then utilized to identify the vehicle 103 or retrieve vehicle identifying information from an associated database.

Figure 2:
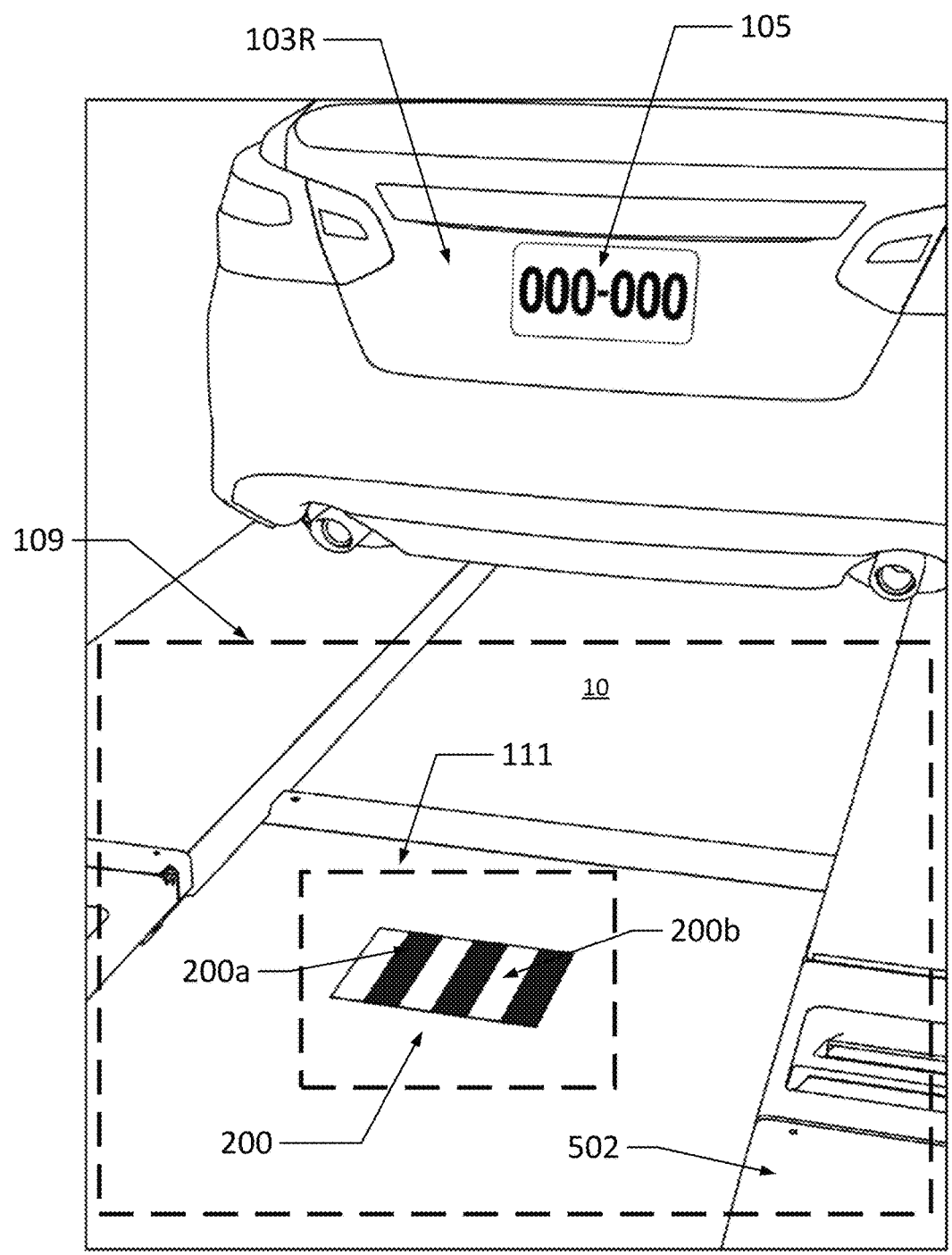
FIG. 2 is an illustration of the optical target feature of FIG. 1 visible within a field of view of the associated imaging sensor.
Figure 3:
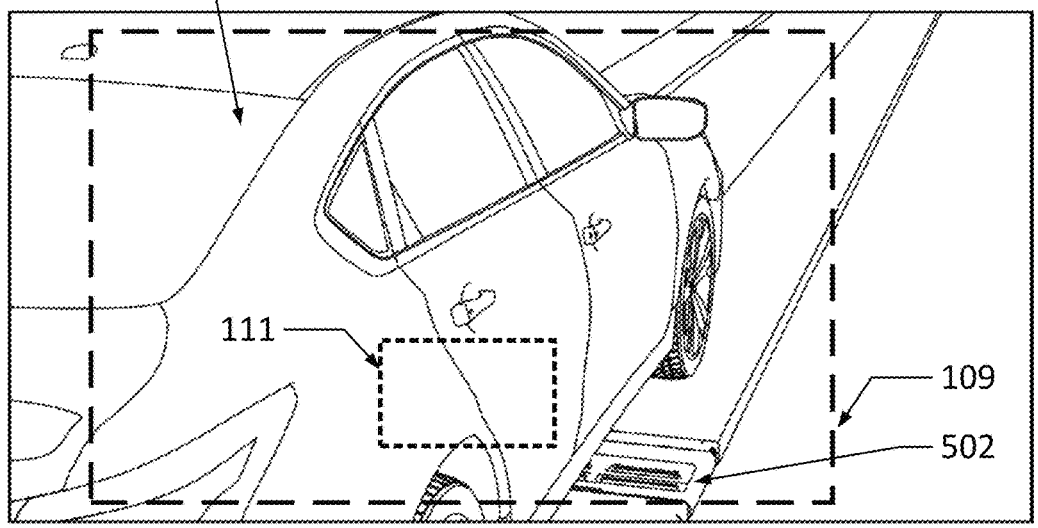
FIG. 3 is an illustration of the optical target feature of FIG. 1, obscured by a passing vehicle within the field of view of the associated imaging sensor.
Figure 4:
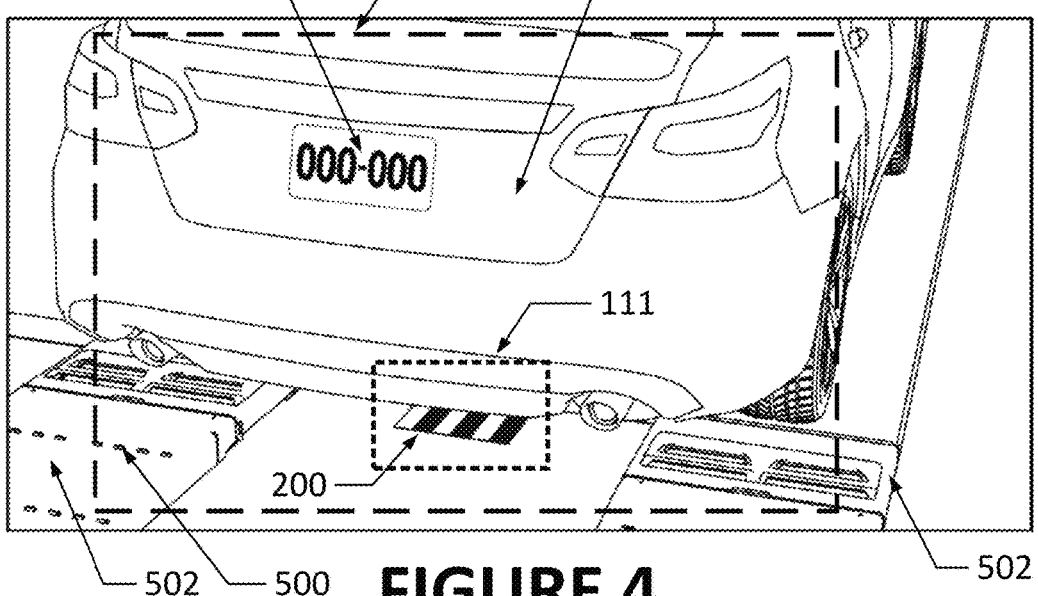
FIG. 4 is an illustration of the optical target feature of FIG. 1 revealed as a passing vehicle reaches an image acquisition region within the field of view of the associated imaging sensor.
Figure 5:
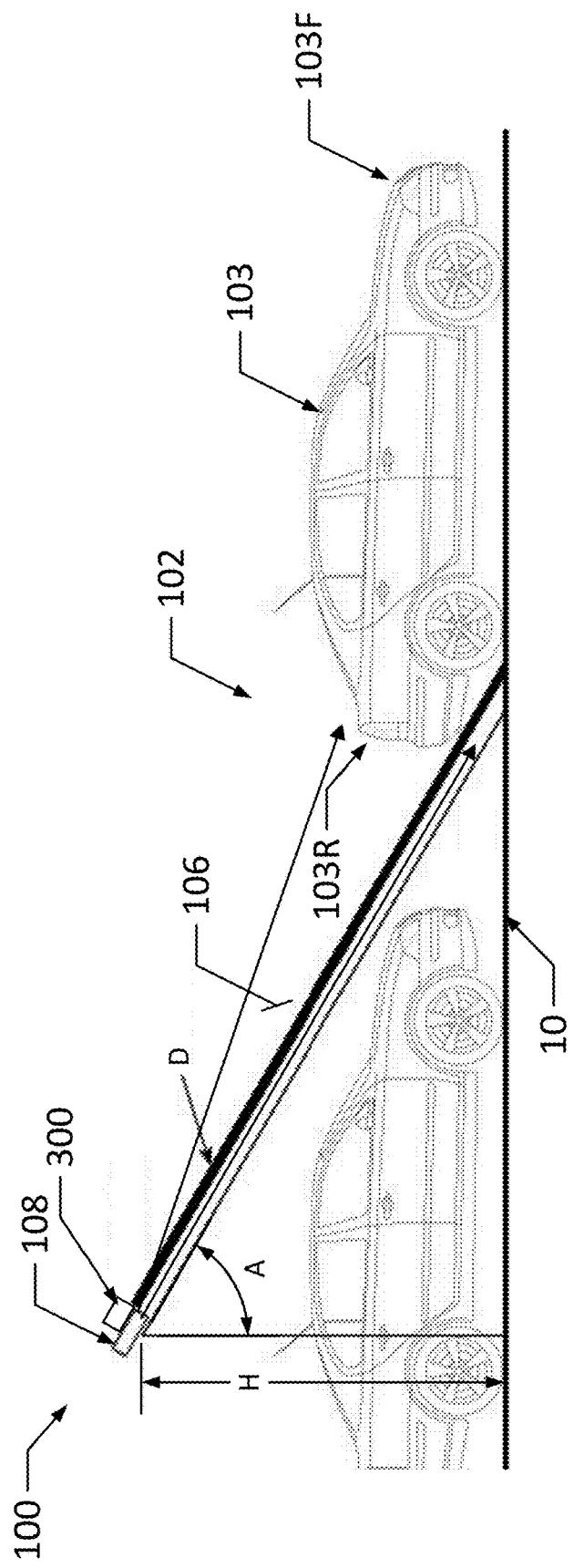
FIG. 5 is an illustration of the position of a axial LIDAR trigger and imaging sensor of the present disclosure relative to a line of vehicles passing through an associated field of view.

Specifically, the method requires the selection of an image frame representing an observed field of view 106 from a set of images sequentially captured by an imaging sensor 108 disposed in a fixed position, as illustrated with reference to FIGS. 1-4. The fixed position of the imaging sensor 108 is selected to have a height H and an angular orientation A such that the field of view 106 encompasses the area through which a vehicle is expected to pass. Initially, a target feature 200 is disposed or established somewhere within the observed field of view 106 of the imaging sensor 108. The position of the target feature 200 is selected such that a vehicle 103 passing through the observed field of view 106 in an expected direction of travel will obscure the target feature 200 from the imaging sensor 108 until the rear surface 103R of the vehicle is located within an ideal observation region for the acquisition of an image 109 capturing a license plate 105 located on the vehicle rear surface 103R, as best seen in FIGS. 4 and 5. For example, as shown in FIG. 2, an optical target feature 200 consisting of alternating black and white regions 202a, 202b is located on the floor surface 10 over which the vehicle 103 passes. The position of the target feature 200 may optionally be selected to be on a different portion of the floor surface 10, on a wall (not shown), or on a stand (not shown), provided that the vehicle 103 passing through the observed field of view 106 will obscure the target feature 200 from the imaging sensor 108 until the rear surface 103R of the vehicle is located within the ideal observation region for the acquisition of an image 109 of the license plate 105. Those of ordinary skill in image acquisition will readily recognize that the ideal observation region will depend upon a number of different variables, including, but not limited to, the specific optical characteristics of the observing imaging sensor 108 and the resolution requirements for the software to extract associated license plate data from an acquired image of a license plate 105.

During operation, the observed field of view 106 is captured in a sequence of images, such as an image stream or video sequence, with sufficient regularity to capture multiple views of a vehicle 103 as it passes through the field of view 106. Each captured image 109 is initially evaluated at an image processing system or suitably configured general purpose computer to identify either the observed presence of, or observed absence of, the target feature 200 at an expected location within the image. For images 109 in which the target feature 200 is observed to be absent or obscured from the view of the imaging sensor 108 by the passing vehicle 103, such as seen in FIG. 3, it is assumed that the passing vehicle 103 is both (a) present in the observed field of view 106, and (b) currently located in a position which is not ideal for acquisition of license plate data (i.e., not located within a preferred observation region of the field of view). If the target feature 200 is identified within a captured image 109, such as seen in FIGS. 2 and 4, the rear surface 103R of the passing vehicle 103, if present within the image, is likely located within an observation region of the field of view 106, but it is unknown if there is a vehicle actually present. To avoid false triggers, an additional test is utilized. Specifically, the system 100 checks to see if the captured image 109 containing an identified target feature 200 was acquired subsequent to a captured image 109 in which the target feature 200 was absent or obscured from view by a vehicle 103. If this condition is met, the rear surface 103R of the vehicle passing through the field of view 106 is expected within the preferred observation region for the acquisition of license plate data, and the image 109 containing the observed target feature 200 is processed further by the image processing system or suitably configured general purpose computer to identify and extract any related license plate data.

Optionally, to reduce the time required to evaluate individual images in order to identify either the observed presence of, or absence of, the target feature 200, the spatial position and orientation of the target feature 200 is maintained in a fixed relationship to an optical axis of the field of view 106, such that when the target feature 200 is observed within an individual image 109, it will be imaged within a determinable sub-window or region 111 of each acquired image 109 due to an optical alignment between the target feature and the light sensing pixel elements contained within the imaging sensor 108. By selectively analyzing only the determinable sub-window or region 111 of each acquired image 109 to detect the presence or absence of the observable features 200a, 200b which define the target feature 200, the need to search an entire image 109 for these features is reduced or eliminated. Once the sub-window or region 111 is determined for a given setup of a specific target feature 200 and imaging sensor 108, the relationship will remain unchanged for so long as the relative physical locations and orientations of the target feature 200 and imaging sensor 108 remain fixed.

The target feature 200 can be defined by any of a variety of identifiable features visible within the acquired images 109. For example, as seen in FIGS. 1-4, one embodiment of the target features consists of a sequence of high-contrast black and white regions 200a, 200b, which when observed by an imaging sensor 108, result in an identifiable pattern of relative pixel values or contrast values within the determinable sub-window or region 111 of an acquired image 109, and which are generally insensitive to changes in illumination. Optionally, the target feature 200 may be constructed from a retro-reflective material, or a material which is reflective to infrared illumination such as may be utilized by an imaging sensor 108 under low-light conditions. Suitable patterns may include changes in contrast, brightness, color, or grayscale levels. Target features 200 consisting of colored regions, light sources, or other optical patterns may be utilized as alternatives to target features 200 composed of black and white regions 200a, 200b. Optionally, the identifiable target features 200 may include alpha-numeric symbols or logos having sufficiently recognizable characteristics. In a further embodiment, the system 100 could be "trained" to recognize an arrangement of invariant features present on fixed surfaces within the observed field of view 106 as the "target features", provided that the arrangement of invariant features meets the necessary criteria of being temporarily obscured by a passing vehicle 103, and observable when the rear surface 103R of the vehicle is ideally located within the field of view 106 for capturing license plate images, as noted previously.

Figure 6:
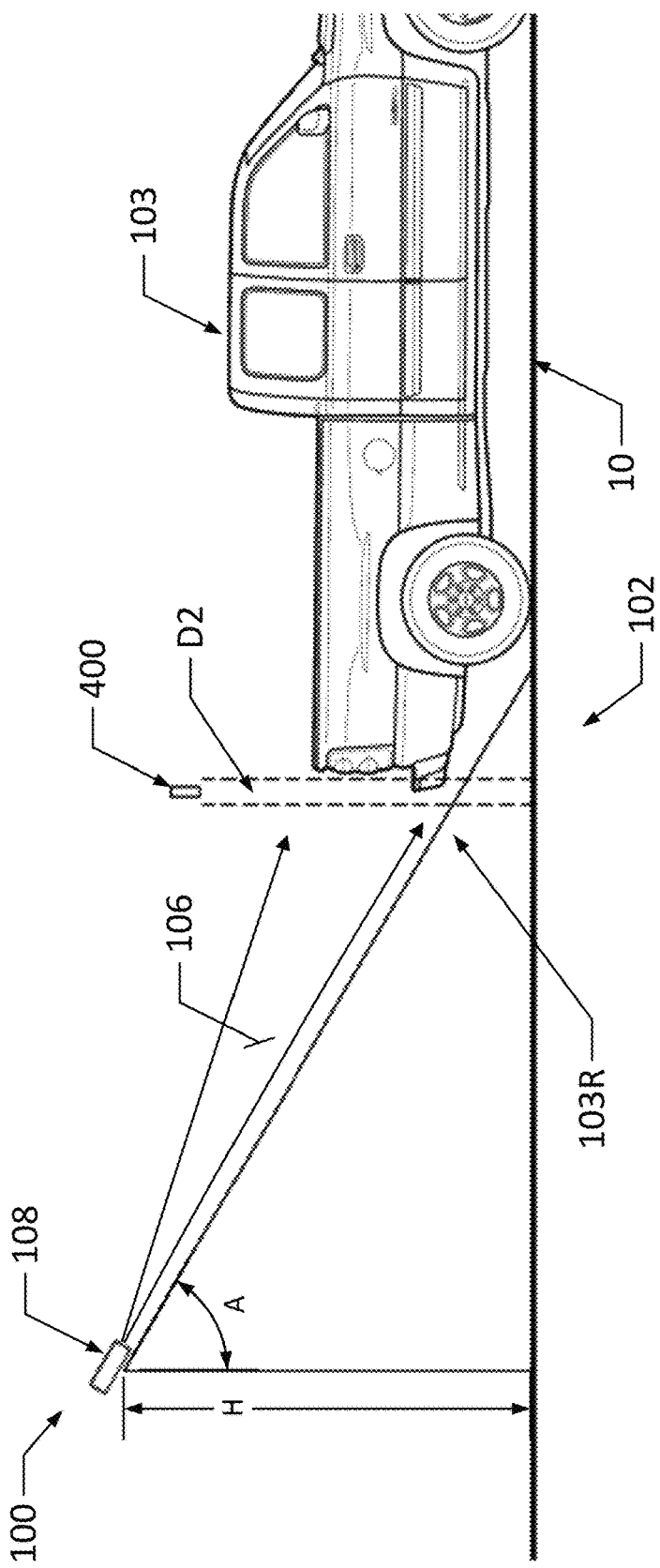
FIG. 6 is an illustration of the position of an acoustic trigger and imaging sensor of the present disclosure relative to a rear surface of a vehicle passing through an associated field of view.

As seen in FIGS. 5 and 6, the vehicle identification system 100 of the present disclosure may be triggered by methods which do not require the detection and observation of visible target features 200. For example, as illustrated in FIG. 5, a distance measurement sensor 300, such as a LIDAR sensor, may be utilized in combination with the imaging sensor 108, to detect when a rear surface 103R of a passing vehicle 103 is within the observation region 102 ideal for imaging a license plate, triggering the acquisition of an image by the imaging sensor 108. With a measurement axis D of the distance measurement sensor 300 aligned relative to the optical axis of the imaging sensor 108, a baseline distance to the floor surface 10 will be measured if there is no vehicle 103 present in the observation region. As a vehicle passes through the field of view 106 and measurement axis D in an expected direction of travel, the distance measurement sensor 300 will measure distances which are less than the baseline distance, and which return to the baseline distance when the rear surface 103R of the vehicle reaches the observation region 102. The changes in the measured distances indicate the passage of the vehicle 103, enabling the return of the measured distance to the baseline distance to act as the trigger signal for the acquisition or evaluation of one or more images by the imaging sensor 108.

The measurement of distance may be acquired along a measurement axis D2 which is not aligned parallel to the optical axis of the imaging sensor 108. For example, as shown in FIG. 6, an acoustical measurement device 400, i.e., a sonar trigger, may be disposed vertically above the path of the vehicle 103, adjacent to the edge of the observation region 102 preferred for the acquisition of license plate images by the imaging sensor 108. The acoustical measurement device or sonar trigger 400 acquires measurements of the vertical distance to the floor 10 as the baseline distance along an axis D2 which is interrupted by the passage of a vehicle 103 through the imaging sensor field of view 106 in an expected direction of travel. As a vehicle 103 passes through the field of view 106, intersecting the measurement axis D2, the acoustical measurement device or sonar trigger 400 measures distances to an upper surface of the vehicle 103 which are less than the baseline distance, and which return to the baseline distance when the rear surface 103R of the vehicle passes through the observation region 102. The changes in the measured distances indicate the passage of the vehicle 103, enabling the return of the measured distance to the baseline distance to act as the trigger signal for the acquisition or evaluation of one or more images by the imaging sensor 108.

Those of ordinary skill will recognize that other types of triggers may be utilized in place of the LIDAR sensor 300 and acoustical sensor 400 illustrated in FIGS. 5 and 6, so long as the triggers provide a suitable means to detect the passage of a vehicle 103 in an expected direction of travel through the field of view 106 of the imaging sensor 108, and enable the acquisition or evaluation of an image capturing the rear surface 103R (or alternatively, the front surface 103F) of the vehicle in the observation region. For example, the vehicle inspection system 100 may incorporate or be in communication with a vehicle measurement system which may include a variety of sensors for acquiring data or measurements associated with a vehicle, such as drive-over tire tread depth measurement sensors 502, drive-over brake test sensors, a vehicle weight scale, a vehicle body condition recording system, or a vehicle wheel alignment measurement system. These additional systems or sensors may incorporate their own triggers 500 for determining when to acquire measurements from a passing vehicle, or may be configured to provide an output signal when the vehicle is in a specific position, either of which can be utilized by the vehicle inspection system 100 as a signal for the imaging sensor 108 to acquire an image of the vehicle. These trigger signals or output signals may be generated by a variety of conventional detection components, switches, optical interrupt beams, proximity sensors, ultrasonic sensors, RFID sensors, pressure plates, or the acquisition of measurement data from various sensor components. Depending upon the relative location of the imaging sensor 108 and the vehicle when the trigger signal or output signal is generated by the additional system, a time delay may be interposed between receipt of the trigger signal or output signal and acquisition of the image 109 by the imaging sensor 108, to permit the vehicle to move to the ideal observation position. The specific placement of the distance triggers 500 relative to the imaging sensor 108 and/or the path of travel for the vehicle 103 may be changed from that which is illustrated in the Figures so long as the aforementioned requirements are met.

Those of ordinary skill in the art will readily recognize that the methods of the present disclosure may be adapted to enable the acquisition or evaluation of an image 109 capturing a front surface 103F of a vehicle 103 as it enters an observation region 102 for the purpose of capturing license plate data from front-mounted license plate 105. For example, a target feature 200 may be disposed at a location which is obscured when the vehicle 103 enters the observation region 102 or reaches an ideal location for imaging a front-mounted license plate 105. By evaluating a sequence of images to identify that in which the target features 200 becomes obscured, a suitable image 109 is selected for further evaluation. Similarly, systems employing distance measurement triggers, such as LIDAR sensors 300 or acoustical sensors 400, may be configured to respond to the detection of a vehicle 103 entering an observation region 102 instead of departing there from, enabling selection of, or acquisition of, an image 109 from an imaging sensor observing a field of view 106 in which the vehicle front surfaces 103F are expected to be present.

Figure 7:
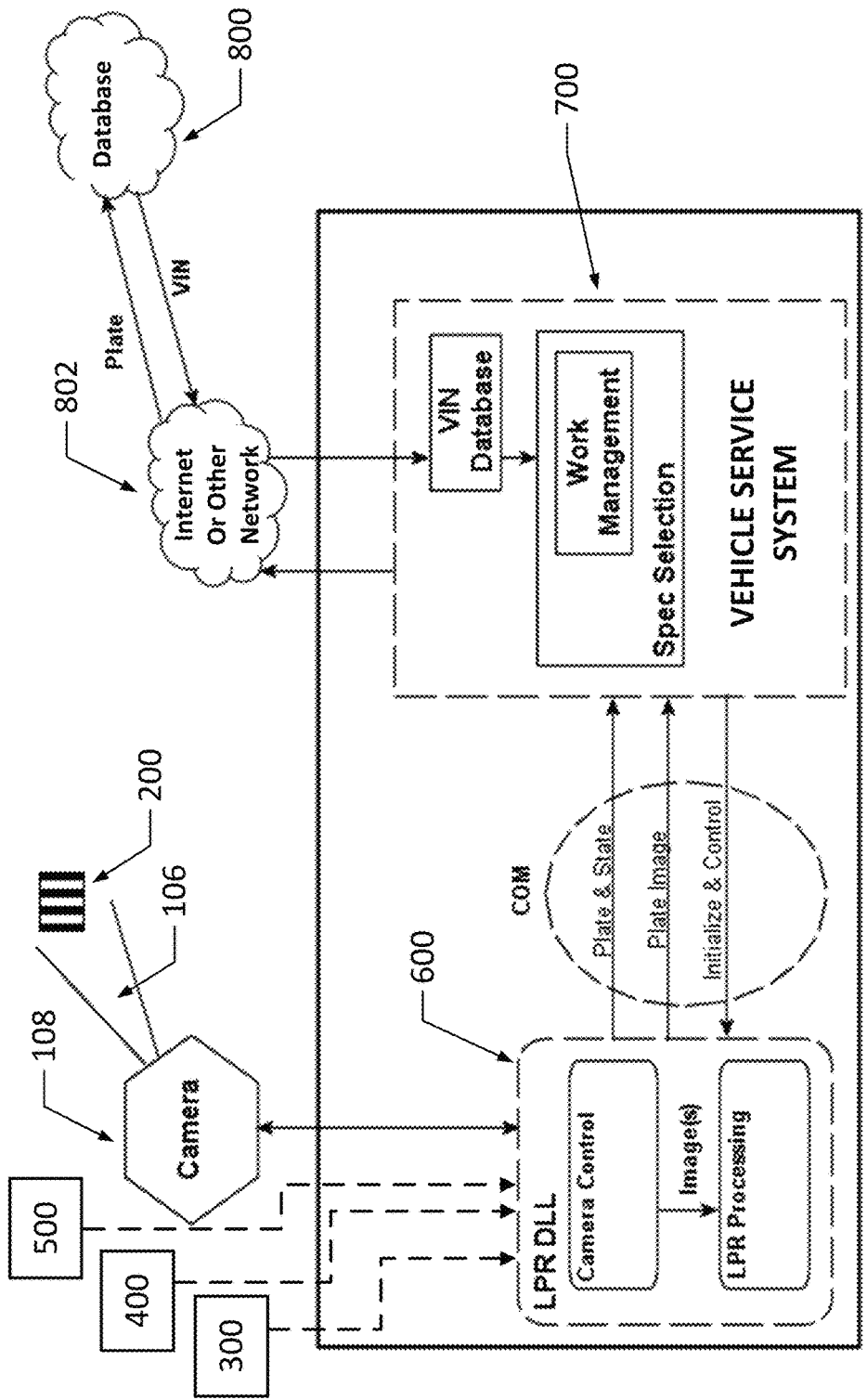
FIG. 7 is an illustration of the various system components for a vehicle identification system of the present disclosure.

Once an image 109 of a vehicle license plate 105 is acquired by the imaging sensor 108 in response to a suitable trigger signal, the image 109 can be evaluated to identify the license plate 105, and to extract the related license plate data using a variety of known image processing and character recognition procedures. These procedures may be in the form of software programs executed by either dedicated or general purpose processing systems 600. As illustrated in FIG. 7, the same dedicated or general purpose processing systems 600 can be configured to control the imaging sensor operation, and to communicate both images and extracted license plate data to a vehicle service system 700. Upon receiving the license plate data and any accompanying images of the vehicle, the vehicle service system 700 can utilize the information for a variety of purposes.

One exemplary purpose is to identify the vehicle 103 associated with the evaluated license plate 105 and acquired image. This may be done by utilizing the extracted license plate data as an index to a database 800 which cross-references license plate data with vehicle identifying information, such as vehicle identification number (VIN) data. This database 800 may be stored locally in a service shop environment (i.e. as part of a customer records database), in a work management system, or accessed over a network connection 802, such as the internet as shown in FIG. 7. Once a vehicle 103 is identified to the vehicle service system 700, various vehicle-specific service procedures, specifications, service records, and owner identifying information can be retrieved from either local or remote databases. Vehicle service or inspection reports can be generated and presented to the vehicle owner or service technician, and new service results or vehicle measurements stored in association with the vehicle identifying information.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle identification process for use with a vehicle service system, comprising:
    monitoring an observation area through which a vehicle will pass to detect the presence of said vehicle by acquiring measurements representative of a distance to a surface within said monitored observation area, said distance measurements acquired along a measurement axis which is intersected by the presence of a vehicle within said monitored observation area, whereby said measured distance is decreased when said vehicle is present, indicating a detection of said vehicle;

responsive to a detection of said vehicle within said monitored observation area, acquiring at least one image of a surface of the vehicle on which a license plate is expected;

processing said at least one acquired image to detect the presence of a license plate on the vehicle and to extract identifying data from said image, said identifying data associated with said detected license plate; and associating said extracted identifying data with at least one item of vehicle-specific data.

2. The vehicle identification process of claim 1 wherein said measurement axis is parallel to an optical axis of said imaging system.

3. The vehicle identification process of claim 1 wherein said measurements representative of distance are acquired acoustically.

4. A vehicle identification process for use with a vehicle service system, comprising:

monitoring an observation area through which a vehicle will pass to detect the presence of said vehicle;

responsive to a detection of said vehicle within said monitored observation area, acquiring at least one image of a surface of the vehicle on which a license plate is expected;

processing said at least one acquired image to detect the presence of a license plate on the vehicle and to extract identifying data from said image, said identifying data associated with said detected license plate;

associating said extracted identifying data with at least one item of vehicle-specific data; and wherein said step of monitoring includes:
a. establishing an optical target feature within said monitored observation area, said optical target feature established in a fixed position which is obscured from a field of view of an imaging sensor monitoring said observation area by a presence of said vehicle within said monitored observation area;
b. acquiring a sequence of images of said field of view;
c. evaluating each of said images to detect a presence or an absence of said optical target feature within each of said images;
d. detecting a presence of said vehicle in response to an observed presence of said optical target feature in an image occurring prior to an observed absence of said optical target feature in a subsequent image; and
e. detecting a departure of said vehicle in response to an observed presence of said optical target feature in an image occurring subsequent to an observed absence of said optical target feature in a preceding image.

5. The vehicle identification process of claim 4 wherein said at least one item of vehicle-specific data is retrieved from a database.

6. The vehicle identification process of claim 4 wherein said at least one item of vehicle-specific data includes at least one of a vehicle identification number, a vehicle make, a vehicle model, a vehicle owner, a vehicle service history, a vehicle recall record, a recommended vehicle service, or vehicle inspection results.

7. The vehicle identification process of claim 4 wherein said at least one item of vehicle-specific data is an image of said vehicle.

8. The method of claim 4 wherein said step of evaluating includes selectively processing only a region of each acquired image to identify the presence or absence of said optical target feature, said region of each acquired image associated with a set of image pixels which are optically aligned with an expected location of said optical target feature in said observation area.

9. The method of claim 4 wherein said optical target feature is located such that either a rear surface of said vehicle is present within said observation area when visibility of said optical target feature is initially restored to said imaging sensor by movement of said vehicle; or
a front surface of said vehicle is present within said observation area when visibility of said optical target feature is initially obscured from said imaging sensor by movement of said vehicle.

10. A vehicle identification method for use with a vehicle inspection system, comprising:

monitoring an observation area through which a vehicle undergoing inspection will pass to detect a presence of said vehicle by acquiring measurements, each representative of a distance to a surface within said monitored area, along a common axis intersected by a passage of said vehicle through said monitored area, whereby said vehicle is detected in response to said measurements decreasing during said passage of said vehicle;

responsive to subsequent detection of said vehicle within said monitored observation area, acquiring at least one image of a surface of said vehicle on which a license plate is present;

processing said at least one acquired image to extract identifying license plate data; and associating said extracted identifying license plate data with at least one item of vehicle-specific data; and responsive to said measurements returning to a baseline distance following a detected passage of said vehicle, indicating said departure of said detected vehicle from said monitored area.

11. The method of claim 10 wherein said step of associating said extracted identifying license plate data includes retrieving said at least one item of vehicle-specific data from a database of vehicle-specific data indexed by said identifying license plate data.

12. The method of claim 11 wherein said at least one item of vehicle-specific data is a vehicle identification number.

13. The method of claim 11 wherein said database is a remote database, and wherein said identifying license plate data and said at least one item of vehicle-specific data are conveyed over a communications network between said vehicle inspection system and said remote database.

14. The method of claim 10 wherein said at least one item of vehicle-specific data is said acquired image.

15. A vehicle identification system configured to automatically identify a vehicle present in a vehicle service area, comprising:

an imaging system disposed to acquire at least one image of a surface on a vehicle present within said vehicle service area;

a processing system configured to receive said acquired images from said imaging system, said processing system further configured to evaluate said acquired images to detect the presence of a license plate on the vehicle surface and to extract identifying data associated with said detected license plate from said image;

wherein said processing system is further configured to associate said extracted identifying data with at least one item of vehicle specific data;

wherein said processing system is further configured to receive a signal from a vehicle measurement system, said signal indicating the presence of a vehicle within said vehicle service area; and wherein said processing system is configured to signal said imaging system to acquire said at least one image of a vehicle surface in response to said signal from said vehicle measurement system.

16. The vehicle detection system of claim 15 wherein said vehicle measurement system is one of a drive-over tire tread depth measurement system, a drive-over brake test system, a vehicle weight scale, a vehicle body condition recording system, or a vehicle wheel alignment measurement system.

17. The vehicle detection system of claim 15 wherein said at least one item of vehicle specific data is stored in a remote database in association with vehicle license plate data; and wherein said processing system is configured to communicate said extracted identifying data to said remote database to retrieve said at least one item of vehicle specific data.

18. The vehicle detection system of claim 15 wherein said item of vehicle specific data includes at least one of a vehicle identification number, a vehicle photograph, a vehicle make, a vehicle model, a vehicle owner, a vehicle service history, a vehicle recall record, a recommended vehicle service, or a vehicle inspection result.

* * * * *